Sept. 3, 1940.  R. P. MARTIN  2,213,739
CAM MECHANISM
Filed Dec. 2, 1938
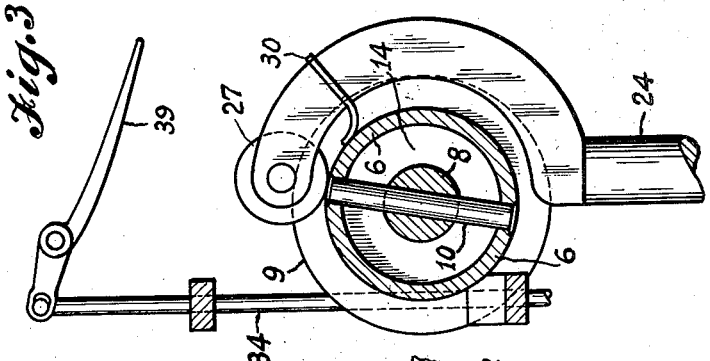
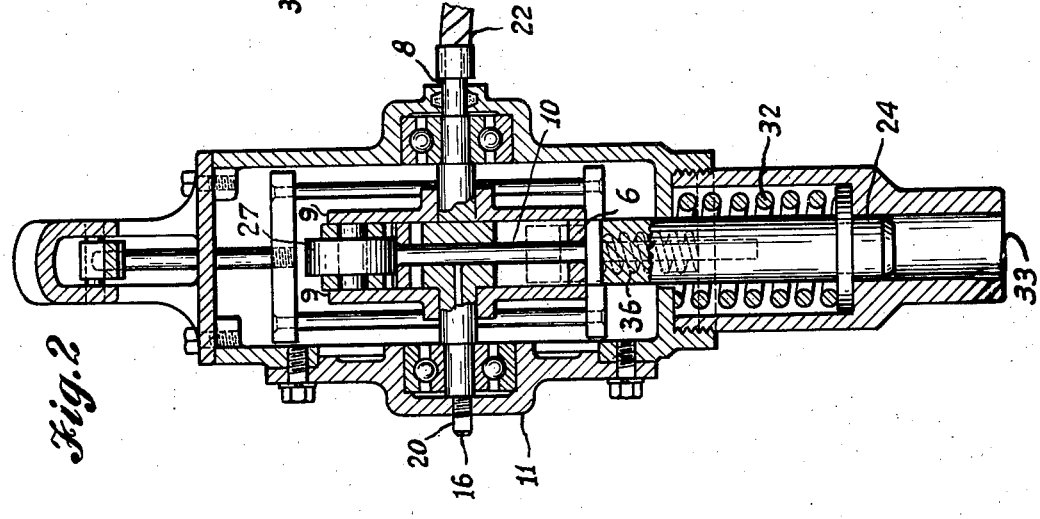
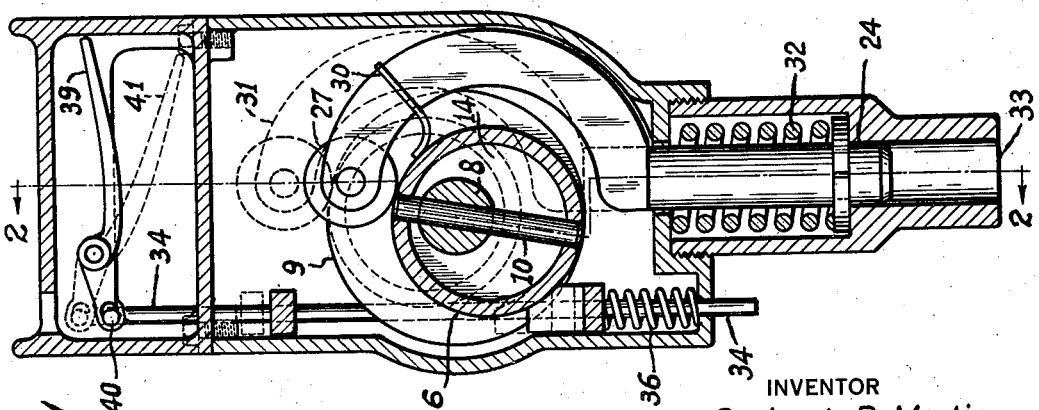
INVENTOR
*Robert P. Martin*

Patented Sept. 3, 1940

2,213,739

UNITED STATES PATENT OFFICE 2,213,739

CAM MECHANISM

Robert P. Martin, Seattle, Wash., assignor to Robert B. Jose, Everett, Wash.

Application December 2, 1938, Serial No. 243,531
In Canada August 2, 1938

3 Claims. (Cl. 74—55)

This invention relates to cam mechanism, having a slip cam provided with an aperture surrounding a drive shaft, and a cross bar which passes through said drive shaft transversely; provided with sufficient clearance to allow a slip motion twice each revolution.

The aperture in the cam acts for two purposes; one is to give clearance to the drive shaft to cause a slip motion of the cam, and the second purpose is to hold lubrication when supported on both sides by guide plates.

A further object is to provide a system to control the stroke of the cam by a trigger in the handle connected to a lever principle connected to a sliding shoe, which is provided with an inclined plane face, in sliding contact with a slip cam to accommodate the different cycles of operation of said cam, and same may be provided with rollers to reduce friction, which is not shown in the drawing. A further object is to hold the slip cam in a concentric position relative to the drive shaft until movement of the reciprocating member is desired by the operator; then the control shoe is lowered by compressing the trigger, allowing the slip cam to shift from concentric to eccentric to cause an incline plane action to lift the reciprocating member, which in turn will compress the power spring and cause a hammer blow by the reciprocating member.

In the accompanying drawing:

Figure 1 is an elevation partly in section of a power hammer.

Figure 2 is a vertical section of Figure 1, on line 2—2.

Figure 3 discloses the slip cam in concentric position and in this position the cam may rotate without causing any cam action.

Referring to the drawing, slip cam 6 is surrounding a drive shaft 8, and a second shaft 10, which passes through the drive shaft and connected to the circular member at both ends, This mechanism is shown in unoperating position, as the circular member is shown in concentric position, and will do no lifting until same is lowered by the central block which allows shaft 10, which is loosely mounted on the drive shaft 8, to slip through the hole in the drive shaft, which changes the position of the slip cam from concentric to eccentric (as shown in Fig. 3).

Numerals 9—9 indicate guide plates for the slip cam. Said plates are of larger diameter than the slip cam and their purpose is to keep the oil or grease from splashing out of the oil space, as well as to guide the slip cam when in operation. Numeral 11 indicates a removable plate to facilitate the assembly of parts.

Numeral 14 designates space for lubrication on the inside of the slip cam. This lubrication is very essential in this device to lubricate the shaft 10 as same passes through the hole in the drive shaft 8. In a reciprocating motion at high speed of over 100 R. P. M. said lubrication is inserted through the hollow shaft at 16, which is shown on connection 20, for an oil pump. 22 indicates a flexible shaft, and 24 is a striking member which is provided with anti-friction roller 27, to contact the slip cam. 30 is the resilient means in the form of a spring to prevent the cam from sticking on dead center. 32 is the power spring that impels the striking member to strike a blow. 33 indicates space to insert a tool to receive the hammer blow from striking member. 34 is the control rod in the form of a yoke to allow the cam to pass and a single rod at lower end surrounded by a spring 36, which holds the control shoe in contact with the slip cam 6. 39 is the trigger member, which is pivoted to member 34 at 40, and its use is to lower the control shoe the desired amount to accommodate the slip cam.

In operating, the drive shaft 8 will rotate member 6 in Figure 1; the slip cam is shown in eccentric position. Band when rotated will raise striking member 24 to the position shown in dotted lines 31, and when trigger 39 is released to position shown in dotted lines 41, spring member 36 will force the slip cam member 6 from eccentric to concentric. In this position shown in Figure 3, the cam may rotate without causing any cam action.

Having now described my invention, I claim:

1. In a cam mechanism comprising a casing, a reciprocating member, a spring associated therewith, a slip cam provided with a cross bar operatively mounted on a drive shaft to cause a slip cam action relative to said drive shaft, and resilient means provided on a reciprocating member to prevent said cam from sticking on dead center, comprising a spring and drive means for said drive shaft.

2. In a cam mechanism comprising a reciprocating member, a spring associated therewith, a casing, a trigger and lever principle to control the lift of a slip cam, comprising a circular member provided with an aperture and a cross bar, operatively mounted transversely on a drive shaft to cause a slip cam action, transversely relative to said cam action and drive shaft, and drive means for said shaft.

3. In a cam mechanism comprising a casing, a reciprocating member, a spring associated therewith, a slip cam provided with an aperture and cross bar operatively mounted on a drive shaft, a control shoe in sliding contact with said cam resilient means back of said shoe to hold said cam in a concentric position and drive means for said drive shaft.

ROBERT P. MARTIN.